United States Patent
Chimura

(10) Patent No.: US 9,846,547 B2
(45) Date of Patent: Dec. 19, 2017

(54) STORAGE MEDIUM AND ELECTRONIC DEVICE

(71) Applicant: KYOCERA Document Solutions Inc., Osaka (JP)

(72) Inventor: Tetsuyuki Chimura, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/280,070

(22) Filed: Sep. 29, 2016

(65) Prior Publication Data

US 2017/0097786 A1    Apr. 6, 2017

(30) Foreign Application Priority Data

Oct. 2, 2015  (JP) .................................. 2015-196346

(51) Int. Cl.
*G06F 3/06*           (2006.01)
(52) U.S. Cl.
CPC .......... *G06F 3/0619* (2013.01); *G06F 3/0644* (2013.01); *G06F 3/0653* (2013.01); *G06F 3/0685* (2013.01)
(58) Field of Classification Search
None
See application file for complete search history.

(56) References Cited

U.S. PATENT DOCUMENTS

| 8,266,396 | B2* | 9/2012 | Yano .................... | G06F 12/0246 711/103 |
| 8,327,066 | B2* | 12/2012 | Heo ..................... | G06F 12/0246 711/103 |
| 8,677,054 | B1* | 3/2014 | Meir .................... | G06F 12/0246 707/817 |
| 8,930,614 | B2* | 1/2015 | Masuo ................. | G06F 12/0246 365/185.33 |
| 8,984,207 | B2* | 3/2015 | Han ..................... | G06F 12/0246 711/103 |
| 2006/0053246 | A1* | 3/2006 | Lee ........................ | G06F 9/4403 711/100 |

(Continued)

FOREIGN PATENT DOCUMENTS

| JP | 2009-055457 A | 3/2009 |
| JP | 2011-044207 A | 3/2011 |

*Primary Examiner* — Mano Padmanabhan
*Assistant Examiner* — Jean Edouard
(74) *Attorney, Agent, or Firm* — Studebaker & Brackett PC

(57) ABSTRACT

An electronic device includes: a first non-volatile storage device, a second non-volatile storage device, and a processor. The first non-volatile storage device has limitations on a number of times of writing therein. The second non-volatile storage device has no limitations on a number of times of writing therein. The processor functions as: a normal writing section, a backup writing section, a substitute writing section, and a determination section. The normal writing section writes data into only the first non-volatile storage device. The backup writing section writes data into both the first non-volatile storage device and the second non-volatile storage device. The substitute writing section writes data into only the second non-volatile storage device. The determination section selects one of the normal writing section, the backup writing section, and the substitute writing section based on the number of bad blocks in the first non-volatile storage device.

5 Claims, 4 Drawing Sheets

(56) References Cited

U.S. PATENT DOCUMENTS

| | | | |
|---|---|---|---|
| 2009/0249052 A1* | 10/2009 | Sareen | G06F 12/0246 713/2 |
| 2009/0259799 A1* | 10/2009 | Wong | G06F 12/0207 711/103 |
| 2009/0319825 A1* | 12/2009 | Yang | G11C 16/3404 714/5.1 |
| 2011/0238971 A1* | 9/2011 | Heo | G06F 12/0246 713/2 |
| 2012/0144095 A1* | 6/2012 | Han | G06F 12/0246 711/103 |
| 2012/0151260 A1* | 6/2012 | Zimmermann | G11C 16/3431 714/16 |
| 2013/0019049 A1* | 1/2013 | Yeh | G06F 12/0246 711/103 |

* cited by examiner

STORAGE MEDIUM AND ELECTRONIC DEVICE

INCORPORATION BY REFERENCE

The present application claims priority under 35 U.S.C. §119 to Japanese Patent Application No. 2015-196346, filed Oct. 2, 2015. The contents of this application are incorporated herein by reference in their entirety.

BACKGROUND

The present disclosure relates to a storage medium storing a storage area management program using a limited-life non-volatile storage device such as a solid state drive (SSD) and an electronic device including the storage area management program.

Hard disk drives (HDDs) have been widely used as non-volatile storage devices in image forming apparatuses and other electronic devices. In recent years, due to technical advancement in a semiconductor field and a cost reduction of semiconductors, some electronic devices use a non-volatile storage device using a semiconductor such as an SSD or a NAND flush device (hereinafter, may be described as a semiconductor drive). The semiconductor drive is useful since the semiconductor drive requires shorter reading time than the HDD. However, many semiconductor drives have limitations on a number of times of writing therein, and have a limited life. That is, the semiconductor drives cannot eternally be used, and thus the limitations on the number of times of writing therein needs to be taken into consideration upon usage of the semiconductor drive.

Thus, an image forming apparatus limits writing into a non-volatile storage device if a number of bad blocks in the non-volatile storage device has reached a specific number.

Upon excess of a number of times of writing into a partition of a non-volatile storage device over a specific number of times, a data storage limiter performs writing in the non-volatile storage device and also creates a backup in another non-volatile storage device. Note that another non-volatile storage device has a larger ensured number of times of rewriting therein than the aforementioned non-volatile storage device.

SUMMARY

A storage medium of the present disclosure is a non-transitory computer readable storage medium storing a program to be executed by a computer. The program includes: a normal writing program code, a backup writing program code, a substitute writing program code, and a determination program code. The normal writing program code causes the computer to write data into only a first non-volatile storage device having limitations on a number of times of writing therein. The backup writing program code causes the computer to write data into both the first non-volatile storage device and a second non-volatile storage device having no limitations on a number of times of writing therein. The substitute writing program code causes the computer to write data into only the second non-volatile storage device. The determination program code causes the computer to select one of the normal writing program code, the backup writing program code, and the substitute writing program code. The determination program code causes the computer to detect a number of bad blocks in the first non-volatile storage device. The determination program code causes the computer to select the normal writing program code if the number of bad blocks is less than a first threshold value. The determination program code causes the computer to select the substitute writing program code if the number of bad blocks is equal to or larger than a second threshold value that is larger than the first threshold value. If the number of bad blocks is equal to or larger than the first threshold value and less than the second threshold value, the determination program code causes the computer to select the backup writing program code to write the data into a partition which is included in partitions of the first non-volatile storage device and which has a larger writing frequency than a specific value and select the normal writing program code to write the data into the partition which has a smaller writing frequency than the specific value.

An electronic device of the present disclosure includes a first non-volatile storage device, a second non-volatile storage device, and a processor. The first non-volatile storage device has a plurality of partitions. Each of the plurality of partitions has a plurality of blocks. The first non-volatile storage device has limitations on a number of times of writing therein. The second non-volatile storage device has no limitations on a number of times of writing therein. The processor functions as a normal writing section, a backup writing section, a substitute writing section, and a determination section. The normal writing section writes data into only the first non-volatile storage device. The backup writing section writes data into both the first non-volatile storage device and the second non-volatile storage device. The substitute writing section writes data into only the second non-volatile storage device. The determination section selects one of the normal writing section, the backup writing section, and the substitute writing section. The determination section detects a number of bad blocks of the blocks included in the first non-volatile storage device. The determination section selects the normal writing section if the number of blocks is less than a first threshold value. The determination section selects the substitute writing section if the number of bad blocks is equal to or larger than a second threshold value that is larger than the first threshold value. If the number of bad blocks is equal to or larger than the first threshold value and less than the second threshold value, the determination section selects the backup writing section to write the data into a partition which is included in partitions of the first non-volatile storage device and which has a larger frequency than a specific value and selects the normal writing section to write the data into the partition which has a smaller frequency than the specific value.

DETAILED DESCRIPTION

Hereinafter, an embodiment of the present disclosure will be described with reference to the drawings. In the present embodiment, an electronic device refers to, for example, a personal computer, a handheld terminal, and an image forming apparatus.

Figure 1:
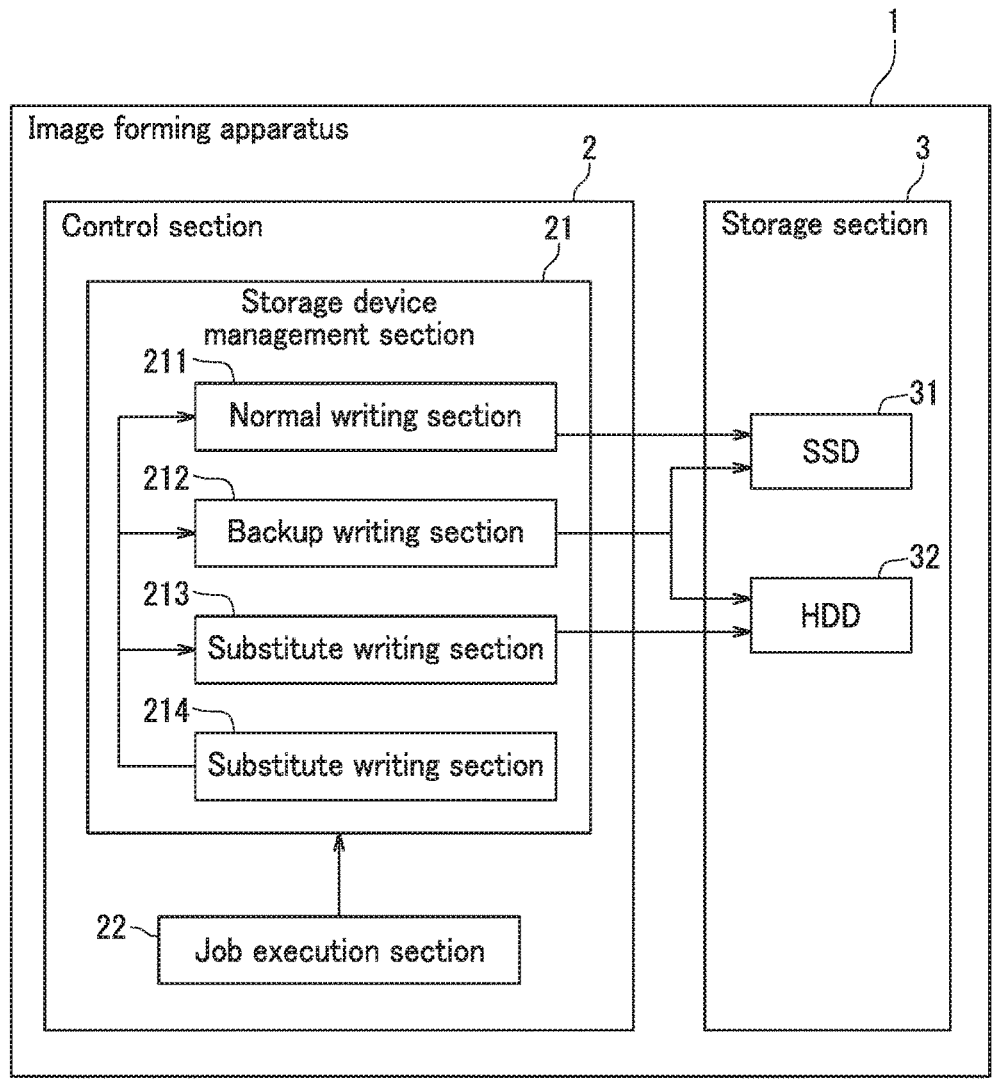
FIG. 1 illustrates configuration of an image forming apparatus according to the present embodiment.

First, configuration of the image forming apparatus as an example of the present disclosure will be described with reference to FIG. 1. FIG. 1 is a diagram illustrating configuration of the image forming apparatus of the present disclosure. The image forming apparatus 1 can be of an electrophotographic or an ink-jetting type. The image forming apparatus 1 can also be a printer, a copier, a multifunction peripheral, or a facsimile device. The image forming apparatus 1 includes a control section 2 and a storage section 3.

The control section 2 is a processor (computer) including a central processing unit (CPU), a read only memory (ROM), and a random access memory (RAM). The ROM stores programs such as a storage device management program. The RAM is used as a work area upon program execution by the CPU. The control section 2 functions as a job execution section 22 as a result of execution of a program for job execution by the CPU.

The storage device 3 includes a solid state drive (SSD) 31 and a hard disk drive (HDD) 32. The SSD 31 is an example of a first non-volatile storage device. The HDD 32 is an example of a second non-volatile storage device. Hereinafter, the SSD 31 and the HDD 32 may be described as non-volatile storage devices in a generic term. Note that the storage device 3 may further include, in addition to the SSD 31 and the HDD 32, for example, a volatile storage device.

The storage device management program includes a program code for centrally managing data reading and writing performed in either or both of the SSD 31 and the HDD 32 by the control section 2.

The control section 2 operates as a storage device management section 21 as a result of execution of the storage device management program by the CPU. More specifically, the control section 2 functions as a normal writing section 211, a backup writing section 212, a substitute writing section 213, and a determination section 214.

The normal writing section 211 writes data into the SSD 31.

The backup writing section 212 writes data into both the SSD 31 and the HDD 32.

The substitute writing section 213 writes data into the HDD 32.

The determination section 214 selects one of the normal writing section 211, the backup writing section 212, and the substitute writing section 213. Details of processing performed by the determination section 214 will be described later on.

The job execution section 22 executes a print job, a scan job, and other jobs of the image forming apparatus 1. Upon the job execution, data may be written into either or both of the SSD 31 and the HDD 32. The job execution section 22 performs the data writing into either or both of the SSD 31 and the HDD 32 via the storage device management section 21.

Typically, the SSD 31 is widely used. The SSD 31 has limitations on a number of times of writing therein. The SSD 31 is virtually divided, having a plurality of partitions. Each of the partitions has a plurality of physical blocks. By a function of the SSD 31, a number of times of writing is equalized between the plurality of blocks included in each partition. Upon reach of the number of times of writing into the given block at an upper limit, the writing into the aforementioned block is prohibited. The block in which the number of times of writing has reached the upper limit turns a bad block.

Typically, the HDD 32 is widely used. The HDD 32 has no limitations on the number of times of writing therein. The HDD 32 is divided, having a plurality of partitions.

Figure 2:
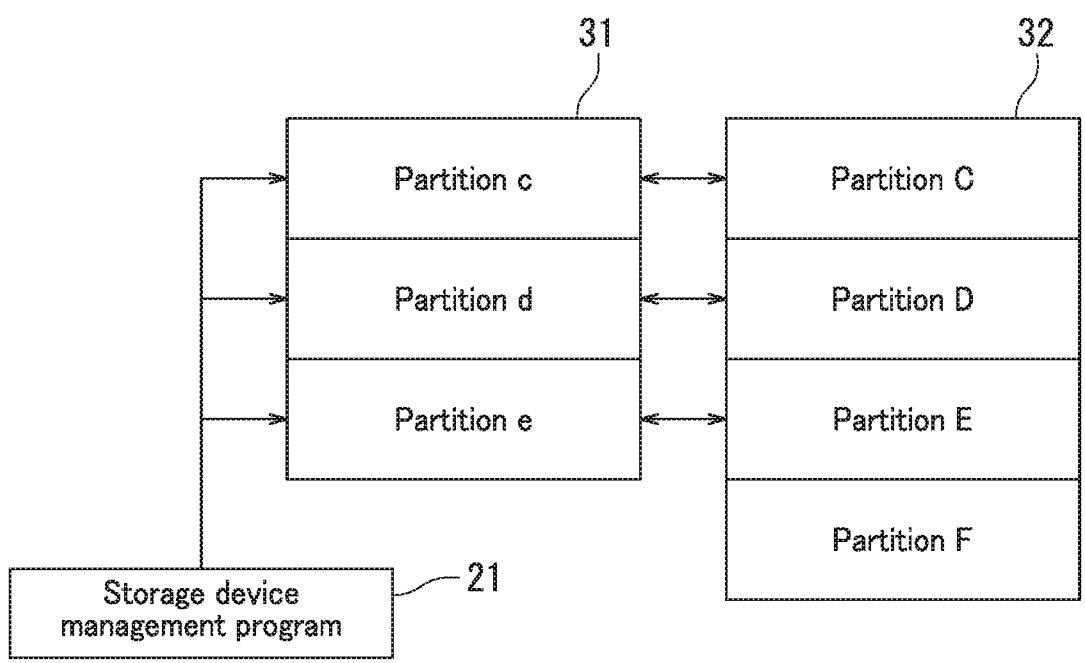
FIG. 2 illustrates configuration of non-volatile storage devices according to present embodiment.

Next, with reference to FIG. 2, configuration of the non-volatile storage devices will be described. FIG. 2 is a diagram illustrating the configuration of the non-volatile storage devices.

As illustrated in FIG. 2, the SSD 31 has three partitions (c, d, e), and the HDD 32 has three partitions (C, D, E). The partition (c) of the SSD 31 and the partition (C) of the HDD 32 are in one-to-one correspondence. Similarly, the partition (d) of the SSD 31 and the partition (D) of the HDD 32 are in one-to-one correspondence, and the partition (e) of the SSD 31 and the partition (E) of the HDD 32 are in one-to-one correspondence. Note that the HDD 32 may further have a partition (F). In such a case, the partition (F) of the HDD 32 may not correspond to any of the partitions (c, d, and e) of the SSD 31. Note that the partitions (c, d, and e) of the SSD 31 and the partitions (C, D, and E) of the HDD 32 may respectively be assigned to different functions of the image forming apparatus 1. For example, the partition (c) and the partition (C) may be assigned to the print function, the partition (d) and the partition (D) may be assigned to the scan function, and the partition (e) and the partition (E) may be assigned to the copy function.

Upon writing of data, which has been requested to be written into the partitions (c, d, and e) of the SSD 31, into the HDD 32, the storage device management section 21 (the backup writing section 212 and the substitute writing section 213) writes the data into the partitions (C, D, and E) respectively corresponding to the partitions (c, d, and e) of the SSD 31 into which the writing have been requested.

Subsequently, with reference to FIG. 3, procedures of data writing will be described.

Figure 3:
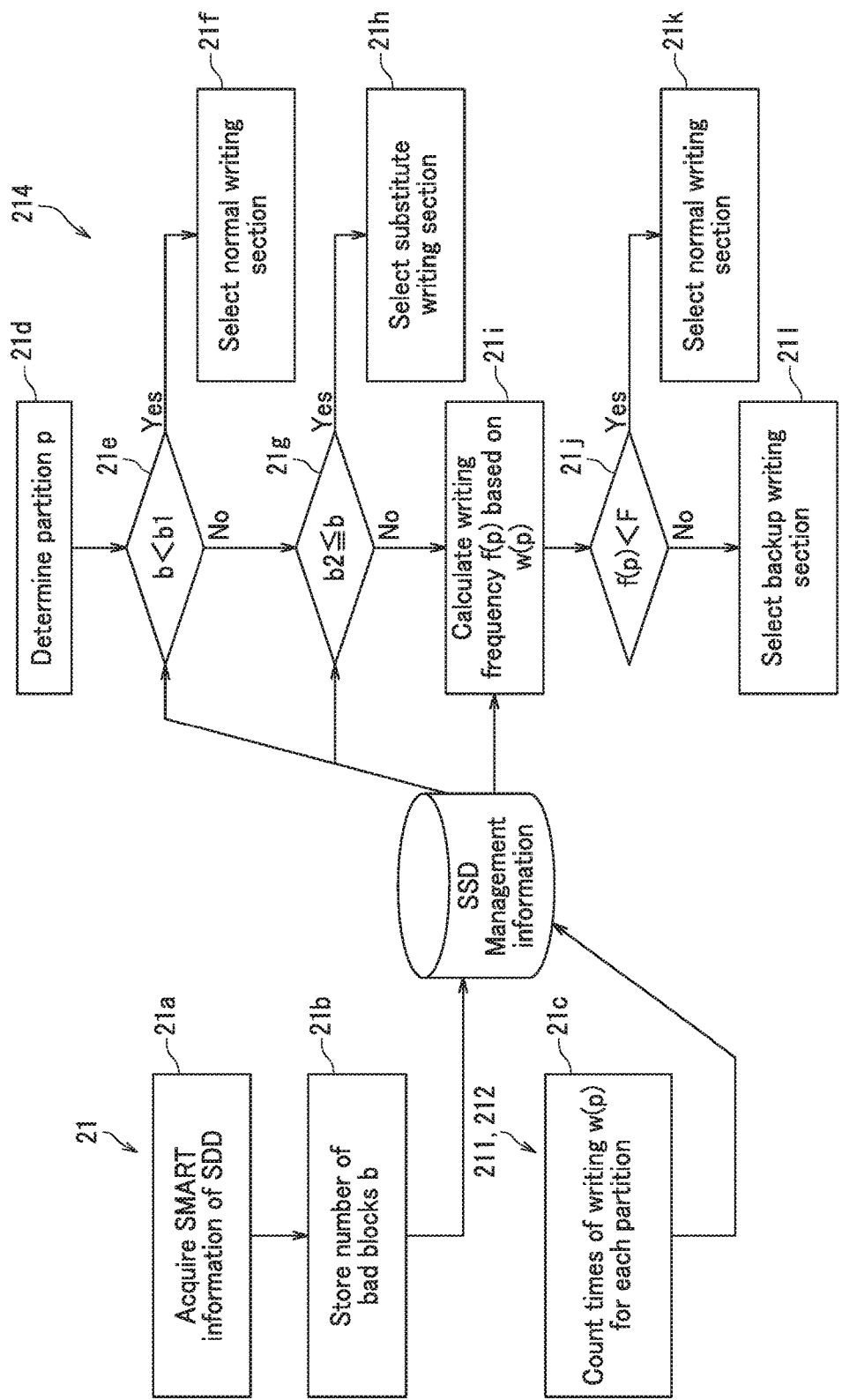
FIG. 3 illustrates processing of a storage device management program according to the present embodiment.

FIG. 3 is a flowchart illustrating processing performed by the storage device management section 21. As illustrated in FIG. 3, the storage device management section 21 periodically (for example, once a day) acquires information of self-monitoring analysis and reporting technology (S.M.A.R.T) from the SSD 31 (step 21a). Hereinafter, the information of the S.M.A.R.T may be described as "SMART information". The SMART information is acquired regardless of whether or not data writing into the SSD 31 is performed and the number of times of data writing into the SSD 31.

The storage device management section 21 obtains a number of bad blocks b from the acquired SMART information. The obtained number of bad blocks b is stored into SSD management information (step 21b).

Upon every data writing into the SSD 31, the normal writing section 211 and the backup writing section 212 count a number of times of writing w for each partition p. The number of times of writing w (p) is stored into the SSD management information. In the present embodiment, upon every data writing into the SSD 31, the normal writing section 211 and the backup writing section 212 increment a value of the number of times of writing w(p), which is saved in the SDD management information, by 1 (step 21c). Note that the normal writing section 211 and the backup writing section 212 may not count the number of times of writing w(p) upon every data writing into the SSD 31. For the number of times of writing w(p), for example, information on date and time of writing may be stored into the SDD management information and a resulting value collected daily may be used.

The determination section 214 performs the following processing with reference to the number of bad blocks b and the number of times of writing w(p).

The determination section 214 first determines the partition p as a data writing destination (step S21d). The partition p is specified by the job execution section 22 or an application for writing other data.

The determination section 214 determines whether or not the number of bad blocks b is smaller than a first threshold value b1 (b<b1) (step 21e). Upon determination that the number of bad blocks b is smaller than the first threshold value b1 (b<b1) (Yes in step 21e), that is, when writing can be performed without any problem since the number of bad blocks b is small, the determination section 214 selects the normal writing section 211 (step 21f). Note that the first threshold value b1 is a threshold value set for the number of bad blocks b. The first threshold value b1 may be a specific ratio (for example, 10%) with respect to the number of blocks included in each partition. As described above, the number of times of writing is substantially equalized between the plurality of blocks included in each partition. Thus, it is assumed that the number of bad blocks b starts to increase since a first occurrence thereof. Therefore, the first threshold value b1 may be a sufficiently small value. For example, the first threshold value b1 may be a value obtained by adding a specific number (for example, 1) to an initial number of bad blocks at factory shipment.

On the other hand, upon determination that the number of bad blocks b is not smaller than the first threshold value b1 (No in 21e), the determination section 214 determines whether or not the number of bad blocks b is equal to or larger than a second threshold value b2 (b2≤b) (step 21g). Upon determination that the number of bad blocks b is equal to or larger than the second threshold value b2 (b2≤b) (Yes in step 21g), that is, when it is difficult to perform the writing into the SSD 31, the determination section 214 selects the substitute writing section 213 (step 21h). Note that the second threshold value b2 is a threshold value set for the number of bad blocks b, which satisfies relationship the second threshold value b2>the first threshold value b1. For example, a value with which job execution using the assigned partition p is impossible may be set as the second threshold value b2. Alternatively, a value corresponding to 50% of the number of blocks included in the partition p may be set as the second threshold value b2. The first threshold value b1 and the second threshold value b2 may be set at such values that permit job completion even upon an increase in the number of bad blocks as a result of writing into the blocks.

Next, processing performed if the number of bad blocks b is equal to or larger than the first threshold value and less than the second threshold value (b1≤b<b2) will be described. In such a case, the determination section 214 obtains a frequency f(p) of writing into the partition p based on the number of times of writing w (p) (step 21i). The writing frequency f(p) can simply be a number of times of writing since start of the use (f(p)=w(p)). If the number of times of writing is collected daily as the number of times of writing w(p), the determination section 214 can define the writing frequency f(p) as a number of times of writing for a last specific number of days (for example, three days).

The determination section 214 determines whether or not the writing frequency f(p) is smaller than a frequency threshold value F (f(p)<F) (step 21j). The frequency threshold value F is set for the writing frequency f(p). The frequency threshold value F is an example of a specific value. Upon determination that the writing frequency f(p) is smaller than the frequency threshold value F (f(p)<F) (Yes in step 21j), the determination section 214 selects the normal writing section 211 (step 21k). On the other hand, upon determination that the writing frequency f(p) is not smaller than the frequency threshold value F, that is, the writing frequency f(p) is equal to or larger than the frequency threshold value F (F≤f(p)) (No in step 21j), the determination section 214 selects the backup writing section 212 (step 21l).

As described above, upon the determination that the writing into the SSD 31 can be performed without any problem (b<b1), the determination section 214 selects the normal writing section 211. On the other hand, upon the determination that it is difficult to perform the writing into the SSD 31 (b2≤b), the determination section 214 selects the substitute writing section 213. Moreover, upon determination that the both do not apply (b1≤b<b2), the determination section 214 selects either of the normal writing section 211 and the backup writing section 212 based on the writing frequency f(p).

Writing into the partition p with a large writing frequency f(p) immediately becomes disabled with high possibility. Thus, the determination section 214 selects either of the backup writing section 212 and the normal writing section 211 based on the writing frequency f(p). More specifically, upon determination that the writing frequency f(p) is equal to or larger than the frequency threshold value F, the determination section 214 selects the backup writing section 212. As a result, the data is written into not only the SSD 31 but also the HDD 32. Therefore, possibility that writing into the partition p in use during process execution is disabled, for example, upon occurrence of a plurality of types of processing involving writing into the specific partition p, can be reduced. On the other hand, writing into the partition p with a small writing frequency f(p) immediately becomes disabled with low possibility. Thus, upon determination that the writing frequency f(p) is smaller than the frequency threshold value F, the determination section 214 selects the normal writing section 211. As a result, the data is written into only the SSD 31. This can suppress an unnecessary increase in processing of writing into the HDD 32.

Figure 4A:
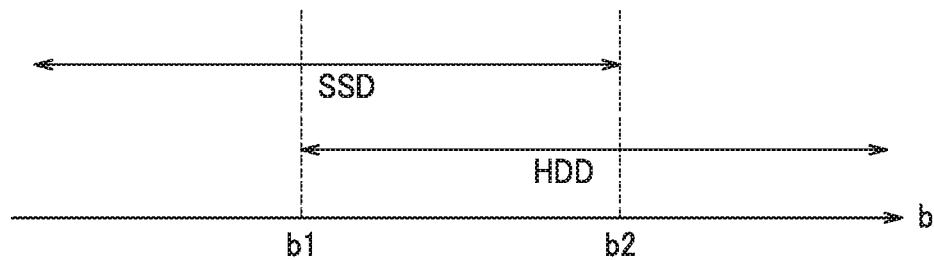
FIG. 4A illustrates relationship between a number of bad bocks and data writing destinations according to the present embodiment.
Figure 4B:
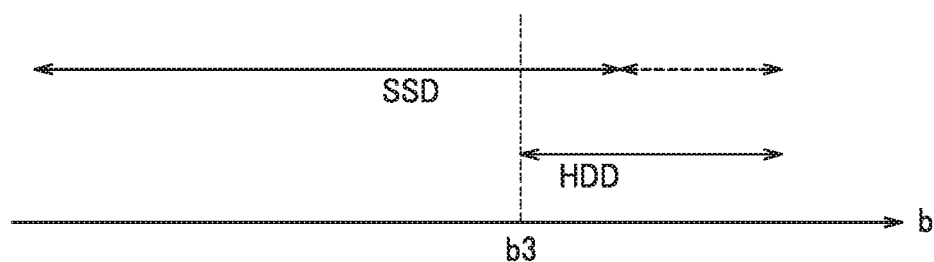
FIG. 4B illustrates relationship between a number of bad blocks and data writing destinations according to a comparative example.

FIG. 4A shows relationship between the number of bad blocks b and data writing destinations according to the present embodiment. FIG. 4B shows relationship between the number of bad blocks b and data writing destinations according to a comparative example. A horizontal axis illustrated in FIGS. 4A and 4B represents a value of the number of bad blocks b. FIG. 4A will be described, referring to, as an example, a partition p with a writing frequency f(p) equal to or larger than the frequency threshold value F (F≤f(p)). Note that in the example illustrated in FIG. 4A, the second threshold value b2 is set at such a value that writing into the SSD 31 is disabled.

The value of the number of bad blocks b increases upon every acquisition of the SMART information. As illustrated in FIG. 4A, the data is written into either or both of the SSD 31 and the HDD 32 based on the value of the number of bad blocks b. During determination by the determination section 214 that the number of bad blocks b is smaller than the first threshold value b1 (b<b1), the data is written into the SSD 31 by the normal writing section 211. Upon determination by the determination section 214 that the number of bad blocks b is equal to or larger than the first threshold value b1 and less than the second threshold value b2 (b1≤b<b2), the data is written into both the SSD 31 and the HDD 32 by the backup writing section 212 (note that the data is written into the HDD 32 only if the writing into the SSD 31 has become disabled). Upon determination by the determination section 214 that the number of bad blocks b is equal to or larger than the second threshold value b2 (b2≤b), the data is written into the HDD 32 only by the substitute writing section 213.

As described above, while the number of bad blocks b is equal to or larger than the first threshold value b1 and less than the second threshold value b2 (b1≤b<b2) (or, during a period from when b1≤b has been reached until the writing becomes disabled), the data is written into both the SSD 31 and the HDD 32. For example, if processing of writing a plurality of pieces of data (for example, a series of processes of writing a plurality of files into a file) is caused by job execution by the job execution section 22, a plurality of pieces of data are all written into at least one of the SSD 31 and the HDD 32 unless the number of bad blocks b exceeds both the first threshold value b1 and the second threshold value b2 during the writing processing. With the present embodiment, the first threshold value b1 can be set at a sufficiently smaller value than the second threshold value b2. As a result, even if a time interval during which the SMART information is acquired is set as the frequency threshold value F, the first threshold value b1 can be defined in a manner such as not to disable the writing into the SSD 31.

Therefore, the SSD 31 can be used until a period immediately before the writing becomes disabled. As a result, a life of the SSD 31 can practically be extended.

Next, a case where a single threshold value is set for the number of bad blocks b will be described with reference to FIG. 4B. In an example illustrated in FIG. 4B, the single threshold value is described as a third threshold value.

As illustrated in FIG. 4B, if the number of bad blocks b becomes equal to or larger than the third threshold value b3 (b3≤b), backing up is started and the data is written into the SSD 31 and the HDD 32. The backup writing section 212 tries to write the data into the SSD 31 even if the writing into the SSD 31 has become disabled. However, the data is actually not written into the SSD 31 (a broken line illustrated in FIG. 4B). That is, if only one threshold value is used, setting the threshold value (the third threshold value b3) at a sufficiently large value (for example, a value equal to the second threshold value b2) results in a decrease in a number of times of data writing into both the SSD 31 and the HDD 32. On the other hand, setting the third threshold value b3 at a sufficiently small value (for example, a value equal to the first threshold value b1) provides the same results as those of the present embodiment until the number of bad blocks b reaches the second threshold value b2, but even after the writing into the SSD 31 has become disabled, the writing into the SSD 31 is continuously tried. As a result, unnecessary writing processing occurs.

With the present embodiment, it is determined based on the partition writing frequency f(p) whether or not to write the data into the HDD 32. As a result, unnecessary data writing into the HDD 32 can be suppressed. As descried in detail above, in the image forming apparatus 1 of the present embodiment, the storage device management section 21 determines a data writing destination using the two threshold values (the first threshold value b1 and the second threshold value b2) and also using the writing frequency f(p) of each partition. Therefore, according to the present embodiment, while reducing a volume of data to be backed up, the SSD 31 can be used until a period immediately before writing therein becomes disabled to thereby extend practical life thereof. Moreover, all the pieces of data written through the series of processing can be written into at least one of the SSD 31 and the HDD 32.

The present embodiment has been described above. With the present embodiment, setting the first threshold value at a smaller ensured number of times of writing than an ensured number of times of writing into the SSD 31 and setting the second threshold value at a value of the ensured number of times of writing into the SSD 31 can provide the following effects. (1) If an end of the life of the SSD 31 has approached (upon determination that the number of bad blocks b may reach the ensured number of times of writing before next detection of the number of bad blocks b), a data writing destination is selected based on the writing frequency f(p). For example, if the writing frequency f(p) of the partition p as the data writing destination is high, while the data is written into the HDD 32, the data is also written into the SSD 31. As a result, even if the SSD 31 turns defective, the data can be extracted from the HDD 32. (2) Immediately before the end of the life of the SSD 31, the data is written into the HDD 32 continuously from a state of the above (1), so that the data is not dispersed in the SSD 31 and the HDD 32. Therefore, in both of the above (1) and (2), the data is reliably saved. It is also possible to use the SSD 31 until reaching the ensured number of times of writing (to substantially extend the life).

With the present embodiment, the SSD and the HDD, which are widely used, can be used. Moreover, with the present embodiment, if the number of bad blocks b is equal to or larger than the first threshold value b1 and less than the second threshold value b2 and the number of times of writing w (p) is equal to or larger than the frequency threshold value F, data is written into the HDD. The HDD has no limitations on the number of times of writing therein. Therefore, the data can more reliably be saved.

Note that in the present embodiment, the number of bad blocks b is obtained for the number of blocks included in the SSD 31, but the number of bad blocks may be obtained for each partition. In such a case, values of the first threshold value b1, the second threshold value b2, and the frequency threshold value F are defined for each partition. As a result, the technique of obtaining the values described above is effective if there is a large difference in a data volume (a number of blocks) between the partitions.

What is claimed is:

1. A non-transitory computer readable storage medium storing a program to be executed by a computer, the program including:
   a normal writing program code that causes the computer to write data into only a first non-volatile storage device having limitations on a number of times of writing therein;
   a backup writing program code that causes the computer to write data into both the first non-volatile storage device and a second non-volatile storage device having no limitations on a number of times of writing therein;
   a substitute writing program code that causes the computer to write data into only the second non-volatile storage device; and
   a determination program code that causes the computer to select one of the normal writing program code, the backup writing program code, and the substitute writing program code, wherein
   the determination program code causes the computer to detect a number of bad blocks in the first non-volatile storage device, select the normal writing program code if the number of bad blocks is less than a first threshold value, select the substitute writing program code if the number of bad blocks is equal to or larger than a second threshold value that is larger than the first threshold value, and if the number of bad blocks is equal to or larger than the first threshold value and less than the second threshold value, select the backup writing program code to write the data into a partition which is included in partitions of the first non-volatile storage device and which has a larger writing frequency than a specific value and select the normal writing program code to write the data into the partition which has a smaller writing frequency than the specific value.

2. An electronic device comprising:

a first non-volatile storage device having limitations on a number of times of writing therein;

a second non-volatile storage device having no limitations on a number of times of writing therein; and a processor, wherein the first non-volatile storage device has a plurality of partitions, each of the plurality of partitions has a plurality of blocks, the processor functions as:

a normal writing section that writes data into only the first non-volatile storage device;

a backup writing section that writes data into both the first non-volatile storage device and the second non-volatile storage device; and a substitute writing section that writes data into only the second non-volatile storage device; and a determination section that selects one of the normal writing section, the backup writing section, and the substitute writing section, and the determination section detects a number of bad blocks of the blocks included in the first non-volatile storage device, selects the normal writing section if the number of blocks is less than a first threshold value, and selects the substitute writing section if the number of bad blocks is equal to or larger than a second threshold value that is larger than the first threshold value, and if the number of bad blocks is equal to or larger than the first threshold value and less than the second threshold value, selects the backup writing section to write the data into a partition which is included in partitions of the first non-volatile storage device and which has a larger writing frequency than a specific value and selects the normal writing section to write the data into the partition which has smaller writing frequency than the specific value.

3. The electronic device according to claim 2, wherein the first non-volatile storage device is a solid state drive, and the second non-volatile storage device is a hard disk drive.

4. The electronic device according to claim 2, wherein the electronic device is an image forming apparatus.

5. The electronic device according to claim 3, wherein the electronic device is an image forming apparatus.

\* \* \* \* \*